July 17, 1928.
J. A. WINTROATH
OIL TUBE WATER SEAL
Filed Nov. 17, 1925
1,677,262
2 Sheets-Sheet 1
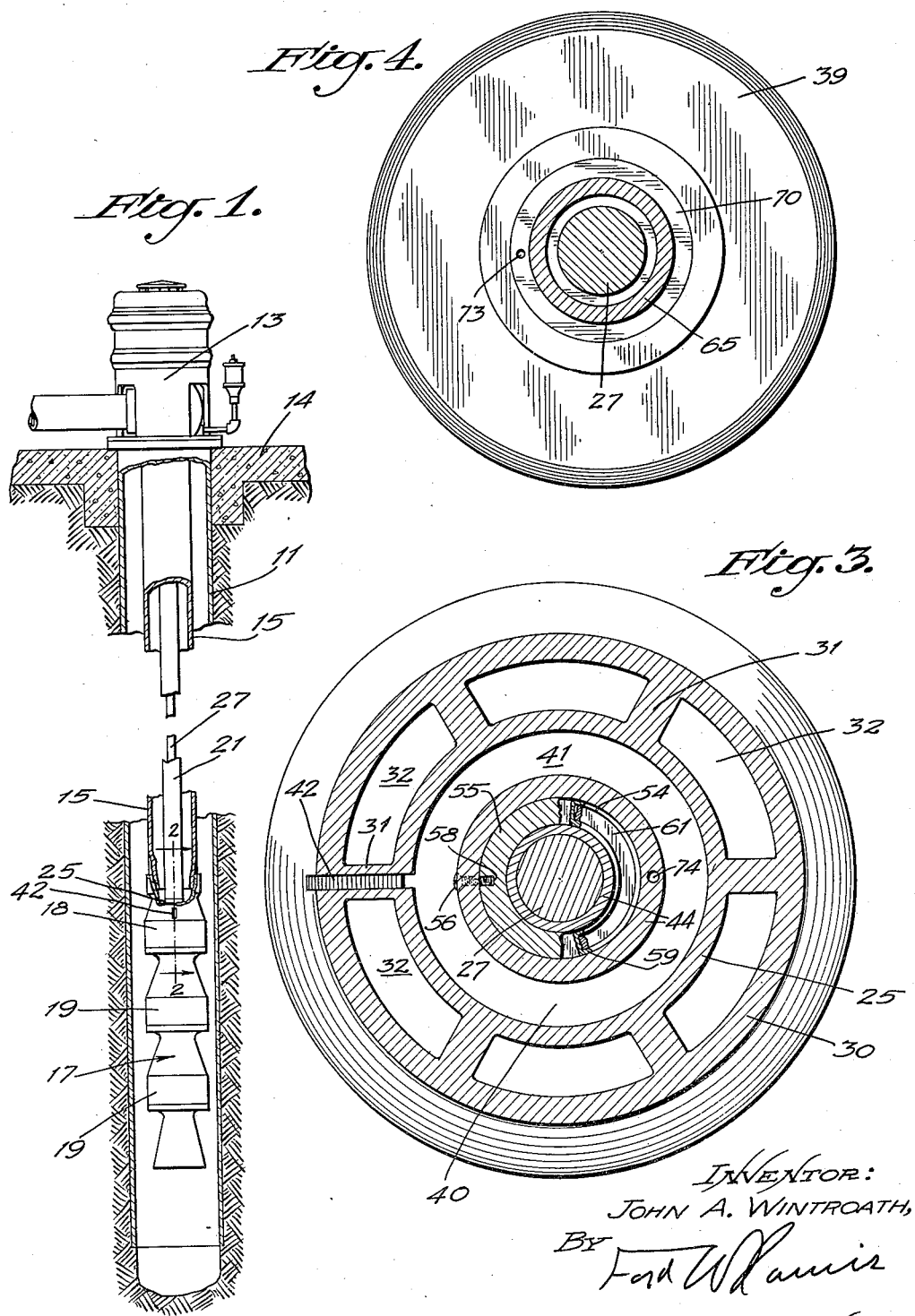

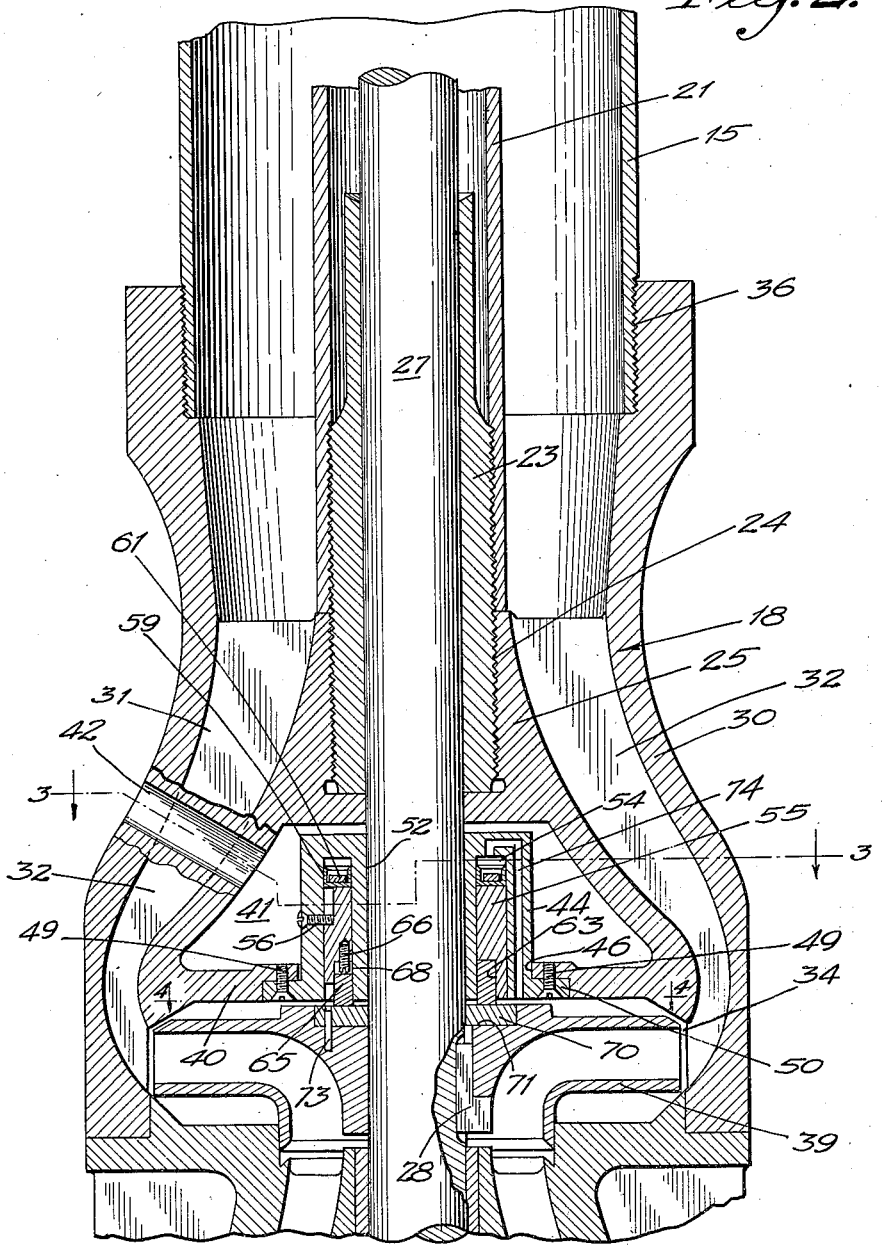

Patented July 17, 1928.

1,677,262

UNITED STATES PATENT OFFICE.

JOHN A. WINTROATH, OF LOS ANGELES, CALIFORNIA, ASSIGNOR TO PEERLESS PUMP COMPANY, OF LOS ANGELES, CALIFORNIA, A CORPORATION OF CALIFORNIA.

OIL-TUBE WATER SEAL.

Application filed November 17, 1925. Serial No. 69,658.

My invention relates to turbine irrigation pumps, and is embodied in an organization for reducing leakage of the pump section and wear on bearings of such pumps.

A common form of turbine irrigation pump has a pump head which is placed at the surface of the ground. A discharge casing extends from this pump head to the lower end of a well, and a pump section is secured at the lower end thereof. The pump section consists of a plurality of castings in which impellers act. A line shaft, whose function is to rotate the impellers, extends from the head to the pump section, surrounding which is an oil tube. This oil tube carries line shaft bearings which are fed with oil entered into the oil tube at the upper end thereof.

The oil is supposed to gravitate to the lower end of the oil tube. When an upper bearing of the pump section becomes worn only slightly, water which sometimes reaches a pressure of 300 pounds will flow in an upward direction through this bearing and through the oil tube. The oil is thus prevented from gravitating through the oil tube, and therefore the line shaft bearings near the lower part of the oil tube will not be lubricated. Leakage, of course, also reduces the efficiency of the pump.

Ground water almost always carries particles of sand, and when a leak manifests itself at the upper end of the pump, this sand will pass between the bearing and the line shaft with the water and will greatly wear away both the bearing and the line shaft.

Water to leak from the upper end of the pump section must pass inwardly around an upper impeller and then upwardly around the line shaft between the upper bearing of the pump section and the line shaft. I have found that by obstructing an inward passage of water above the upper impeller, leakage may be greatly reduced.

It is an object of my invention to provide in a pump of the character mentioned an organization for obstructing the passage of water from the pump section around the entire shaft.

It is another object of my invention to provide an organization of this character having an engager surrounding the line shaft, which contacts a movable part carried by the line shaft and thus obstructs the leakage of water.

It is another object of my invention to provide an organization of this character having a plunger which has equalized water pressure thereon, this plunger carrying the mentioned engager.

It is another object of my invention to provide a hardened insert which is contacted by the engager.

Other objects and advantages of my invention will be made evident hereinafter.

Referring to the two sheets of drawings in which I illustrate my invention,

Fig. 1 is a diagrammatic view showing my invention employed in a typical turbine irrigation pump.

Fig. 2 is an enlarged sectional view through the upper end of the pump section of the pump shown in Fig. 1 clearly showing the features of my invention.

Fig. 3 is a section taken on the line 3—3 of Fig. 2.

Fig. 4 is a section taken on the line 4—4 of Fig. 2.

With reference to Fig. 1 of the drawing, 11 represents a well casing which extends from the surface of the ground to the bottom of a well. A pump head 13 is supported at the upper end of the well by a foundation 14. A discharge tube 15 extends from the pump head 13 to the point near the bottom of the well, and has a pump section 17 attached to the lower end thereof. The pump section 17 is composed of a main bearing bowl 18 and a plurality of impeller bowls 19. An oil tube 21 extends from the pump head 13 to the pump section 17, passing through the discharge tube 15. As shown in Fig. 2, the lower end of the oil tube 21 is threadably secured to a main bearing 23 which is threadably secured in a socket 24 of an inner shell 25 of the main bearing bowl 18. Extending through the oil tube 21 is a line shaft 27 which extends through the pump section 17.

As clearly shown in Fig. 2, the main bearing bowl 18 has an outer shell 30 and radial vanes 31 by which the inner shell 25 is supported. A passage 32 is provided between the inner and outer shells 25 and 30. This passage connects an impeller chamber 34 with the discharge tube 15 which is threadably secured at 36 to the upper part of the main bearing bowl 18. The line shaft 27 extends through the main bearing 23 and entirely through the main bearing bowl 18. An impeller 39 is locked on the line shaft 27 by means of a key 28, this impeller 39 being situated in the impeller chamber 34. The impeller bowls 19 are constructed to receive impellers which are similar to the impeller 39. In the inner shell 25 above the radial wall 40 is an intermediate by-pass chamber 41 which connects to the exterior of the main bearing bowl 18 by means of a by-pass opening 42 which is formed through the inner and outer shells 25 and 30 and through one of the vanes 31.

A bearing member 44 is secured to the main bearing bowl 18 so that it rests within the by-pass chamber 41. This bearing member 44 extends through the concentric opening 46 formed in the radial wall 40 and is secured to this radial wall 40 by means of screws 49 which extend through a flange 50 of the bearing member 44. The bearing member 44 has an opening which provides a cylindrical bearing face 52 in which a portion of the line shaft 27 journals.

An annular opening 54 is formed in the bearing member 44, opening into the impeller chamber 34. Placed in this annular opening 54 is a plunger 55 which is restrained from rotation by a screw 56. This screw 56, as shown clearly in Figs. 2 and 3, is secured in the bearing member 47 and extends into an axial slot 58 formed at the upper end of the plunger 55. A U-shaped cup leather 59 is held against an upper face of the plunger 55 by means of a ring 61.

The lower end of the plunger 55 is provided with a counterbore 63. Pressed in this counterbore 63 is a hardened and ground engager 65. This engager 65 is cylindrical and is restrained from rotation by a screw 66. This screw 66 is secured in the plunger 55 and extends into the counterbore 63 and into a slot 68 formed at the upper part of the engager 65. An annular steel insert 70, which is hardened and ground, is secured in a counterbore 71 formed at the upper part of the impeller 39. The annular insert 70 fits in fluid-tight relationship in the counterbore and is prevented from rotating by a pin 73. Formed in the bearing member 44 is a passage 74 which connects the impeller chamber 34 with the upper end of the annular opening 54 of the bearing member 44 at a point above the plunger 55.

When the pump head 13 is set into action, the line shaft 27 is rotated and the impeller 39 of the main bearing bowl 18 and impellers of the bowls 19 are rotated therewith. Water is forced upwardly by impellers in the impeller bowls 19. The water is taken by the impeller 39 of the main bearing bowl 18 from the impeller bowl 19 therebelow and is forced upwardly through the passage 32 into the discharge casing 15 by means of which it is conveyed to the surface of the ground. As previously mentioned, the pressure in the main bearing bowl 18 sometimes reaches a pressure as high as several hundred pounds. Since the intermediate by-pass chamber 41 is at all times directly in communication with the water in the well through the by-pass opening 42, and since the water in the well at the opening 42 is at only the small pressure produced by the submergence at this point, there is a considerable difference between the pressure just above the impeller and the pressure in the chamber 41. This difference in pressure acts to force water upwardly between the exterior of the shaft 27 and the bearing surface 52, and there is a marked tendency for the water to pass inwardly between the impeller 39 and the radial wall 40 and to pass upwardly between the bearing face 52 and the line shaft 27. When water has sand carried therein to any great extent, the bearing member 44 would very quickly be cut away.

My invention operates to greatly reduce a leakage of water from the upper end of the pump section around the shaft 27. By providing the by-pass 74 the pressure of the water is transferred to the upper end of the plunger 55. This pressure works in opposition to the pressure on the lower end of the plunger, and the downward and upward pressures upon the plunger will therefore be in balance. The weight of the plunger 55 causes it to move downwardly until the lower face of the cylindrical engager 65 contacts an upper face of the annular insert 70. The contacting of these surfaces obstructs a passage of water through the space between the impeller 39 and the radial wall 70 or the bearing member 44. This arrangement permits two hardened surfaces, one on the engagers 65 and one on the annular inserts 70, to always contact each other irrespective of the vertical position of the impeller 39 in the impeller chamber 34. Even though this arrangement would not entirely shut off a leakage, it will obstruct the leakage of water through the space between the impeller 39 and the radial wall 40 and greatly reduce any leakage of water between the shaft 27 and the bearing face 52 of the bearing member 49.

Any water which should leak between the shaft and the bearing member 44 may pass to the exterior of the main bearing bowl 18 through the by-pass 42. The by-pass chamber 41, due to its open communication with the water of the well through the opening 42 will at all times be at the pressure of submergence at the opening 42 which is always slight and very little water will be forced upwardly through the main bearing 23 into the lower end of the oil tube 21 even if no oil is present in this tube. In practice oil is fed periodically into this tube and collects in the bottom thereof until it builds up a pressure in excess of the submergence pressure so that oil flows slowly downward through the bearing 23 and escapes into the chamber 41 from which it may escape into the well through the opening 42, thus lubricating the bearing 23 and preventing water and sand from entering this bearing. There will, therefore, be no interference to the gravity of oil feed which takes place in th oil tube 21 and, therefore, line shaft bearings carried by the oil tube will be thoroughly lubricated.

From the foregoing description it is plainly evident that my invention resides in an organization for reducing leakage of a pump section by obstructing the passage of water to the line shaft at the upper end of the section. This not only increases the efficiency of the pump, but greatly reduces wear on the bearing at the top of the pump section, and reduces the probability of the lubrication of the line shaft bearings being hindered, and in this manner conduces to the longevity of the pump. By providing hardened contacting surfaces, wear upon these contacting parts is reduced to a minimum. By equalizing the water pressure on the plunger, the force of contact between the engager 65 and the annular insert 70 is in proportion to the weight of the plunger, and the friction of engagement will therefore be small.

I claim as my invention:

1. In a turbine pump of the class described, the combination of: a pump bowl; a line shaft extending into said pump bowl; a bearing supported in said bowl in which said line shaft journals; an impeller secured to said line shaft in said bowl below said bearing, said impeller forcing water through said pump bowl when said line shaft is rotated; and means between said bearing and said impeller for obstructing a flow of water to said line shaft.

2. In a turbine pump of the class described, the combination of: a pump bowl; a line shaft extending into said pump bowl; a bearing supported in said bowl in which said line shaft journals; an impeller secured to said line shaft in said bowl below said bearing, said impeller forcing water through said pump bowl when said line shaft is rotated; and an engager surrounding said line shaft and extending through a space between said bearing and said impeller for obstructing a flow of water through said space to said line shaft.

3. In a turbine pump of the class described, the combination of: a pump bowl; a line shaft extending into said pump bowl; a bearing supported in said bowl in which said line shaft journals; an impeller secured to said line shaft in said bowl below said bearing, said impeller forcing water through said pump bowl when said line shaft is rotated; a plunger carried in said bowl above said impeller, said plunger surrounding said line shaft; an insert secured to an upper face of said impeller, said insert surrounding said line shaft; and an engager carried by said plunger and surrounding said line shaft, said engager being adapted to extend through a space between said bearing and said impeller and to engage said insert.

4. In a turbine pump of the class described, the combination of: a pump bowl; a line shaft extending into said pump bowl; a bearing supported in said bowl in which said line shaft journals; an impeller secured to said line shaft in said bowl below said bearing, said impeller forcing water through said pump bowl when said line shaft is rotated; a plunger carried in said bowl above said impeller, said plunger surrounding said line shaft; a hardened and ground insert secured to an upper face of said impeller, said hardened and ground insert surrounding said line shaft; and a hardened and ground engager carried by said plunger and surrounding said line shaft, said hardened and ground engager being adapted to extend through a space between said bearing and said impeller and to engage said hardened and ground insert.

5. In a turbine pump of the class described, the combination of: a pump bowl; a line shaft extending into said pump bowl; a bearing supported in said bowl in which said line shaft journals; an impeller secured to said line shaft in said bowl below said bearing, said impeller forcing water through said pump bowl when said line shaft is rotated; a plunger carried in said bowl above said impeller, said plunger surrounding said line shaft, there being means for equalizing the pressure on the upper and lower end of said plunger; an insert secured to an upper face of said impeller, said insert surrounding said line shaft; and an engager carried by said plunger and surrounding said line shaft, said engager being adapted to extend through a space between said bearing and said impeller and to engage said insert.

6. In a turbine pump of the class described, the combination of: a pump bowl; a line shaft extending into said pump bowl; a bearing supported in said bowl in which said line shaft journals; an impeller secured to said line shaft in said bowl below said bearing, said impeller forcing water through said pump bowl when said line shaft is rotated; a plunger carried in said bowl above said impeller, said plunger surrounding said line shaft, there being means for equalizing the pressure on the upper and lower end of said plunger; a hardened and ground insert secured to an upper face of said impeller, said hardened and ground insert surrounding said line shaft; and a hardened and ground engager carried by said plunger and surrounding said line shaft, said hardened and ground engager being adapted to extend through a space between said bearing and said impeller and to engage said hardened and ground insert.

7. In a turbine pump of the class described, the combination of: a pump bowl; a line shaft extending into said pump bowl; a bearing supported in said bowl in which said line shaft journals; an impeller secured to said line shaft in said bowl below said bearing, said impeller forcing water through said pump bowl when said line shaft is rotated; a plunger carried in an annular opening formed in the lower end of said bearing, which annular opening connects with a space between said bearing and said impeller, there being a passage connecting said space with the upper end of said annular opening for equalizing the pressure on said plunger; means for rendering said plunger non-rotatable; an annular insert secured to an upper face of said impeller; and an engager carried by said plunger and engaging said insert, said engager extending through said space and obstructing a flow of water to said line shaft.

8. In a turbine pump of the class described, the combination of: a pump bowl; a line shaft extending into said pump bowl; an impeller secured to said line shaft in said bowl, said impeller forcing water through said pump bowl when said line shaft is rotated; and means for obstructing a flow of water from said impeller to said line shaft, said means being self-compensating for wear.

9. In a turbine pump of the class described, the combination of: a pump bowl; a line shaft extending into said pump bowl; an impeller secured to said line shaft in said bowl, said impeller forcing water through said pump bowl when said line shaft is rotated; and means for obstructing a flow of water from said impeller to said line shaft, irrespective of variation in position of said impeller in said pump bowl.

10. In a turbine pump of the class described, the combination of: a pump bowl; a line shaft extending into said pump bowl; a bearing supported in said bowl in which said line shaft journals; an oil tube enclosing said shaft; an impeller secured to said line shaft in said bowl below said bearing, said impeller forcing water through said pump bowl when said line shaft is rotated; and means for obstructing a flow of water between said shaft and said bearing to said oil tube.

11. In a turbine pump of the class described, the combination of: a pump bowl; a line shaft extending into said pump bowl; a bearing supported in said bowl in which said line shaft journals; an oil tube enclosing said shaft; an impeller secured to said line shaft in said bowl below said bearing, said impeller forcing water through said pump bowl when said line shaft is rotated; and means for obstructing a flow of water between said shaft and said bearing to said oil tube, said means being self-compensating for wear.

12. In a turbine pump of the class described, the combination of: a pump bowl; a line shaft extending into said pump bowl; a bearing supported in said bowl in which said line shaft journals; an oil tube enclosing said shaft; an impeller secured to said line shaft in said bowl below said bearing, said impeller forcing water through said pump bowl when said line shaft is rotated; and means for obstructing a flow of water between said shaft and said bearing to said oil tube, said means being self-compensating for variation in position of said impeller in said pump bowl.

13. In a turbine pump of the character described, the combination of: a pump bowl; a bearing communicating at its lower end with a by-pass chamber which is in open communication with the water of the well in which the pump is placed; a line shaft extending through said bearing into an impeller chamber; an impeller on said shaft in said impeller chamber; a wall between said by-pass chamber and said impeller chamber having a bore through which said shaft passes; and packing means so placed as to obstruct the flow of water from said impeller chamber to said by-pass chamber through said bore.

14. In a turbine pump of the character described, the combination of: a pump bowl; a bearing communicating at its lower end with a by-pass chamber which is in open communication with the water of the well in which the pump is placed; a line shaft extending through said bearing into an impeller chamber; an impeller on said shaft in said impeller chamber; a wall between said by-pass chamber and said impeller chamber having a bore through which said shaft passes; and packing means so placed as to obstruct the flow of water from said impeller chamber to said by-pass chamber through said bore, said packing means being self-compensating for wear.

15. In a turbine pump of the character described, the combination of: a pump bowl; a bearing communicating at its lower end with a by-pass chamber which is in open communication with the water of the well in which the pump is placed; a line shaft extending through said bearing into an impeller chamber; an impeller on said shaft in said impeller chamber; a wall between said by-pass chamber and said impeller chamber having a bore through which said shaft passes; packing means so placed as to obstruct the flow of water from said impeller chamber to said by-pass chamber through said bore; and means by which said packing means is automatically adjusted to compensate for wear.

16. In a turbine pump of the character described, the combination of: a pump bowl; a bearing communicating at its lower end with a by-pass chamber which is in open communication with the water of the well in which the pump is placed; a line shaft extending through said bearing into an impeller chamber; an impeller on said shaft in said impeller chamber; a wall between said by-pass chamber and said impeller chamber having a bore through which said shaft passes; packing means so placed as to obstruct the flow of water from said impeller chamber to said by-pass chamber through said bore; and means by which said packing means is automatically adjusted to compensate for wear and for variations in the relative vertical positions of said impeller and said lower bearing.

17. In a turbine pump of the character described, the combination of: a pump bowl; a bearing communicating at its lower end with a by-pass chamber which is in open communication with the water of the well in which the pump is placed; a line shaft extending through said bearing into an impeller chamber; an impeller on said shaft in said impeller chamber; a wall between said by-pass chamber and said impeller chamber having a bore through which said shaft passes; and a member movable vertically in fluid-tight relationship with said pump bowl to contact with the upper surface of said impeller and thus to obstruct the flow of water from said impeller chamber to said by-pass chamber through said bore.

18. In a turbine pump of the character described, the combination of: a pump bowl; a bearing communicating at its lower end with a by-pass chamber which is in open communication with the water of the well in which the pump is placed; a line shaft extending through said bearing into an impeller chamber; an impeller on said shaft in said impeller chamber; a wall between said by-pass chamber and said impeller chamber having a bore through which said shaft passes; a member movable vertically in fluid-tight relationship with said pump bowl to contact with the upper surface of said impeller and thus to obstruct the flow of water from said impeller chamber to said by-pass chamber through said bore; and means to hold said vertically movable member in fluid-tight relationship with the top of said impeller at any possible vertical position of said impeller in said impeller chamber.

19. In a turbine pump of the character described, the combination of: a pump bowl; a bearing communicating at its lower end with a by-pass chamber which is in open communication with the water of the well in which the pump is placed; a line shaft extending through said bearing into an impeller chamber; an impeller on said shaft in said impeller chamber; a wall between said by-pass chamber and said impeller chamber having a bore through which said shaft passes; a member movable vertically in fluid-tight relationship with said pump bowl to contact with the upper surface of said impeller and thus to obstruct the flow of water from said impeller chamber to said by-pass chamber through said bore; and pressure-operated means to hold said vertically movable member in fluid-tight relationship with the top of said impeller at any possible vertical position of said impeller in said impeller chamber.

20. In a turbine pump of the character described, the combination of: a pump bowl; a bearing communicating at its lower end with a by-pass chamber which is in open communication with the water of the well in which the pump is placed; a line shaft extending through said bearing into an impeller chamber; an impeller on said shaft in said impeller chamber; a wall between said by-pass chamber and said impeller chamber having a bore through which said shaft passes; a member movable vertically in fluid-tight relationship with said pump bowl to contact with the upper surface of said impeller and thus to obstruct the flow of water from said impeller chamber to said by-pass chamber through said bore; and means operated by the fluid pressure of the liquid in said impeller chamber to hold said vertically movable member in fluid-tight relationship with the top of said impeller at any possible vertical position of said impeller in said impeller chamber.

In testimony whereof, I have hereunto set my hand at Los Angeles, California, this 10th day of November, 1925.

JOHN A. WINTROATH.